Figure 1:
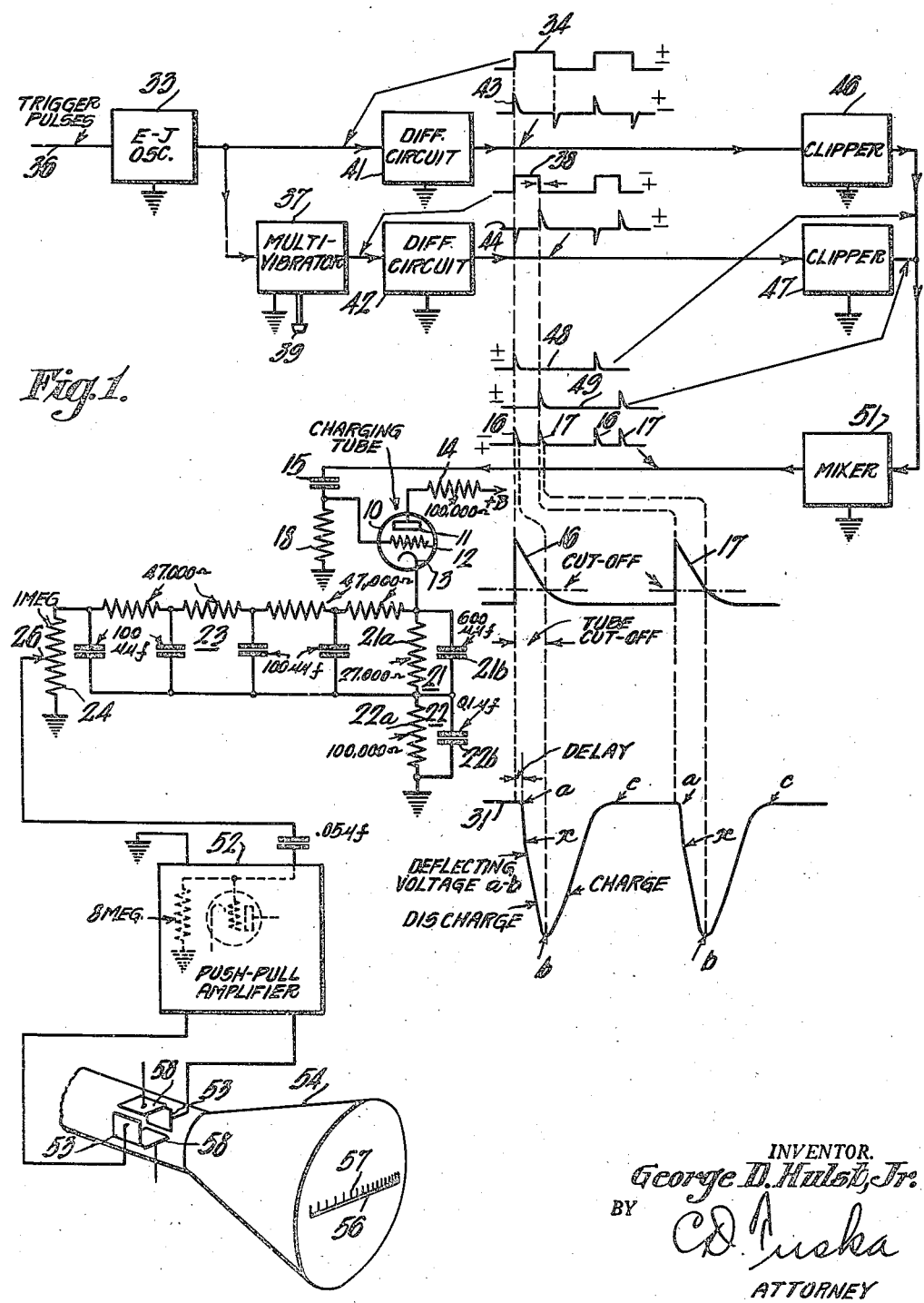

March 8, 1949.  G. D. HULST, JR  2,463,969
CATHODE-RAY DEFLECTION CIRCUIT
Filed March 17, 1945  2 Sheets-Sheet 1

INVENTOR.
George D. Hulst, Jr.
BY
ATTORNEY

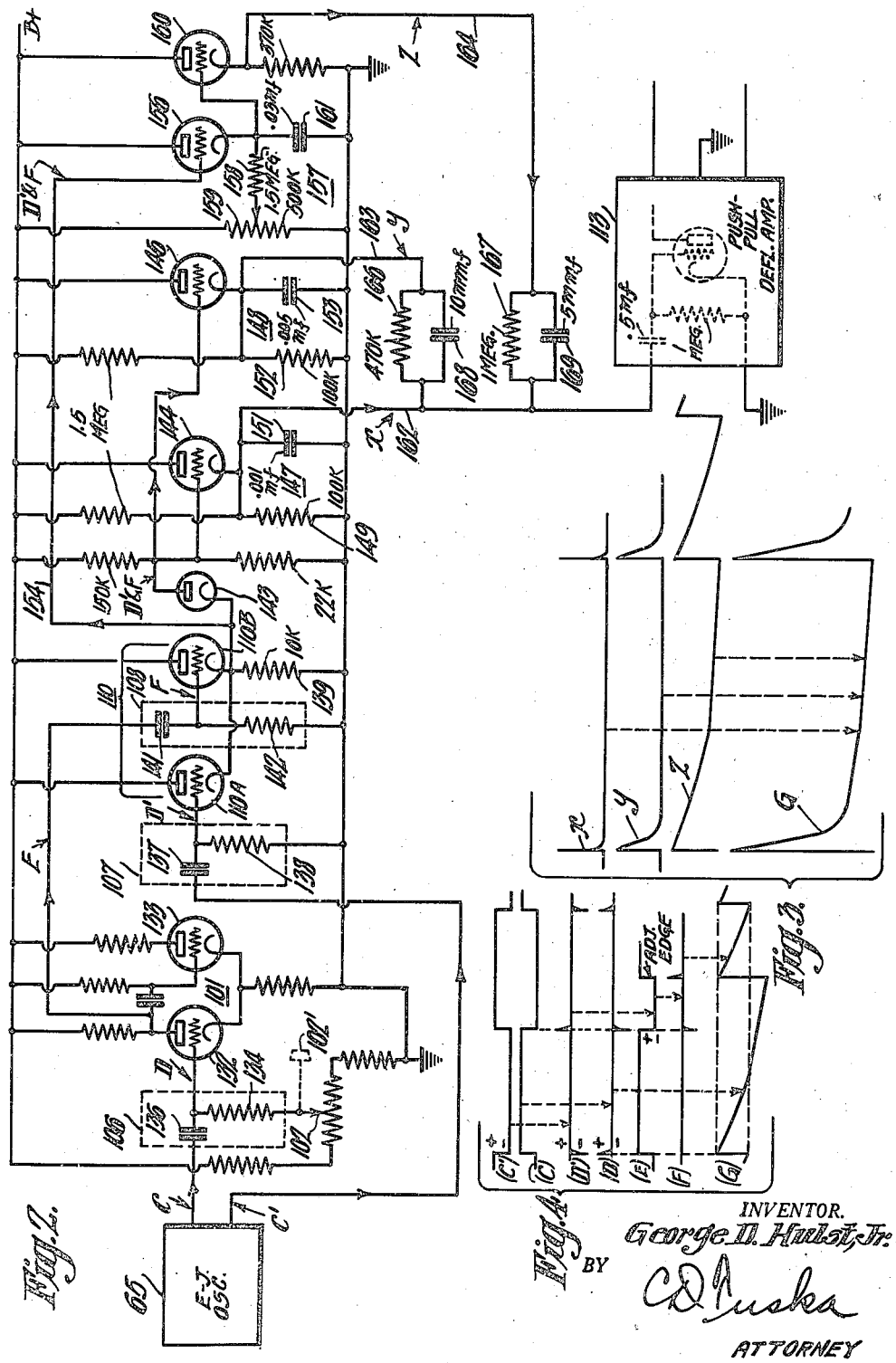

Patented Mar. 8, 1949

2,463,969

UNITED STATES PATENT OFFICE 2,463,969

CATHODE-RAY DEFLECTION CIRCUIT

George D. Hulst, Jr., Upper Montclair, N. J., assignor to Radio Corporation of America, a corporation of Delaware Application March 17, 1945, Serial No. 583,255

9 Claims. (Cl. 250—27)

This application is a continuation-in-part of application Serial No. 568,084, filed December 14, 1944, now Patent Number 2,432,158, in the names of George D. Hulst, Jr., Earl Schoenfeld and Garrard Mountjoy, and entitled Radio navigation systems.

My invention relates to cathode ray deflection circuits and particularly to circuits for producing a cathode ray trace having an expanded portion.

An object of the invention is to provide an improved means for producing a cathode ray trace having an expanded portion.

A further object of the invention is to provide an improved means for producing a deflecting voltage wave having an initially steep slope followed by a more gradual slope.

By way of example, one embodiment of the invention will be described as designated for producing a fast-sweep trace in a radio navigation system such as that disclosed in Patent Number 2,445,361 in the names of Garrard Mountjoy, George D. Hulst, Jr., and Earl Schoenfeld, and entitled Radio navigation system.

In practicing the above-mentioned embodiment of the invention, a vacuum tube has two resistor-capacitor circuits, having different time constants, which are connected in series with each other in the cathode circuit of the tube. The capacitors of these two circuits are charged by anode current flow through the vacuum tube. The deflecting voltage is produced by applying a pulse to the grid of the vacuum tube to drive it to plate current cut-off. During this cut-off period the two capacitors discharge at different rates through their shunting resistors, respectively, whereby the sum of the voltages across the two shunting resistors is a deflecting voltage of the desired wave form. In another embodiment of the invention a plurality of resistor-capacitor circuits having different time constants are charged through separate tubes.

The invention will be better understood from the following description taken in connection with the accompanying drawing in which Figure 1 is a block and circuit diagram of one embodiment of the invention, Figure 2 is a circuit diagram of a second embodiment of the invention, and Figures 3 and 4 are groups of graphs that are referred to in explaining the operation of the circuit shown in Fig. 2.

Referring to Fig. 1, the deflecting wave producing circuit comprises a vacuum tube 10 having an anode 11, a control grid 12 and a cathode 13. The anode 11 has a direct-current voltage applied thereto through an anode resistor 14. The grid 12 has periodically recurring negative voltage pulses 16 and 17 applied thereto through a coupling capacitor 15, these pulses driving the tube 10 periodically to anode current cut-off. A grid leak resistor is shown at 18.

Between the cathode 13 and ground there are connected a resistor-capacitor circuit 21 comprising a resistor 21a and a capacitor 21b, and a resistor-capacitor circuit 22 comprising a resistor 22a and a capacitor 22b. As shown by the sample circuit values on the drawing, given in ohms, microfarads and micro-microfarads, the circuit 21 has a faster time constant than the circuit 22.

An integrating or delay circuit 23 is connected to receive the voltage from across the circuit 21 and supply it to a voltage divider resistor 24 having a variable tap 26 thereon. The resistor 24 is connected across the resistor-capacitor circuits 21 and 22 by way of the delay circuit 23 and ground. The delay circuit 23 comprises a plurality of sections connected in cascade, each section consisting of a series resistor and a shunt capacitor, values for which are given on the drawing in ohms and micro-microfarads, merely by way of example.

The deflecting voltage waves resulting from the application of pulses 16 and 17 to the grid 12 are shown by the graph 31. The useful deflecting portion of the wave lies between the points $a$ and $b$, while the "resetting" or capacitor recharging portion of the wave lies between the points $b$ and $c$.

Referring now to the circuit that produces the pulses 16 and 17, there is shown, by way of example, an Eccles-Jordan oscillator 33 that produces a square wave 34 in a fixed time relation to triggering or timing pulses supplied over a lead 36. The wave 34 is applied to a multivibrator 37 to produce a rectangular wave 38. The timing of the back edge of the narrow pulse portion of wave 38 is adjustable by means of a knob 39 which may, for example, vary the positive bias on the grid of a multivibrator tube as is well understood in the art.

The waves 34 and 38 are applied to differentiating circuits 41 and 42 to produce the waves 43 and 44, respectively, consisting of positive and negative pulses. The waves 43 and 44 are passed through clipping circuits 46 and 47 to produce the waves 48 and 49, respectively, each comprising pulses of one polarity only. The waves 48 and 49 are supplied to a mixer tube or circuit 51 which supplies to the grid 12 the combined waves 48 and 49 as the negative pulses 16 and 17.

The resulting deflecting wave appearing at the tap 26 is amplified by a suitable amplifier 52 and applied to the deflecting plates 53 of a cathode ray tube 54 whereby the desired expanded trace 56 is obtained. The expansion at the left end of the trace 56 is apparent from the wider spacing of the timing marks indicated at 57, the marks 57 being produced by applying timing pulses of a certain repetition rate to the vertical deflecting plates 58. The source of such timing pulses may comprise a crystal oscillator followed by a chain of frequency dividers (not shown) and may be the same source that supplies triggering pulses to the E–J oscillator 33.

Referring more specifically to the way in which the deflecting wave shown by graph 31 is produced, during the time the tube 10 is held at cut-off by a pulse 16 or 17, the capacitors 21b and 22b discharge through resistors 21a and 22a, respectively. The time constant of the circuit 21 is short compared with the cut-off period while that of the circuit 22 preferably is long compared with the cut-off period. After the rounding off of the corner of the wave 31 and the resulting slight delay, indicated by the legend, the wave has a steeply sloping portion a—x produced by the fast capacitor discharge in the counter 21, and then a more gradually sloping portion x—b produced by the slower capacitor discharge in the circuit 22. Thus, there is produced the desired deflecting wave portion a—b that produces the expanded cathode ray trace 56 whereby timing marks, for example, at the left end of the trace may be counted more accurately. In the example given, the wave portion a—b is approximately logarithmic in wave form.

For some applications of the invention the delay at the start of the deflecting wave portion a—b may be unnecessary or undesirable, in which case the delay network 23 is omitted and the resistor 24 is connected directly across the circuits 21 and 22.

Fig. 2 shows another embodiment of the invention in which resistor-capacitor circuits of different time constants are charged through separate vacuum tubes. This particular circuit with the circuit values indicated on the drawing is designed to provide a slow sweep trace having an expanded portion for use in a radio navigation system, for example, where timing marks are to appear on the trace. This embodiment of the invention is described in Patent Number 2,432,158 in the names of George D. Hulst, Jr., Earl Schoenfeld and Garrard Mountjoy, and entitled Radio navigation systems.

Referring to Figs. 2 and 4, an Eccles-Jordan oscillator 65 supplies a square wave voltage C through a differentiating circuit 100 to a multivibrator 101 which comprises two triodes 132 and 133 that are connected to form a cathode-coupled multivibrator. The resulting pulses D produced by the differentiating circuit 100 are applied to the grid of the triode 132, this grid having an adjustable positive bias applied thereto from a potentiometer resistor 102 through a grid resistor 134. This bias is adjusted by means of the control knob 102' for adjusting the time of occurrence of the back edge of the narrow multivibrator pulse of the wave E. The differentiating circuit 106 comprises a small coupling capacitor 136 and the grid resistor 134.

A wave C' is also obtained from the E—J oscillator 65, this wave being the same as the wave C but of opposite polarity. The wave C' is supplied to a differentiating circuit 107 to obtain the pulses D'.

The differentiating circuit 107 supplies the pulses D' to the grid of a triode 110A that forms part of a mixing circuit 110. The differentiating circuit 107 comprises a small coupling capacitor 137 and a grid resistor 138. A differentiating circuit 108 applies the pulses F to the grid of a triode 110B forming the other part of the mixer 110, the tubes 110A and 110B having a common cathode resistor 139 across which the mixed signals D' and F appear. The differentiating circuit 108 comprises a small coupling capacitor 141 and a grid resistor 142.

The mixed signals D' and F preferably are applied through a clipper diode 143 to keep the amplitude of the positive pulses a constant value. The clipped pulses are applied to the grids of a pair of triodes 144 and 146.

The triodes 144 and 146 have wave shaping cathode circuits 147 and 148, respectively. The circuit 147 comprises a cathode resistor 149 and a capacitor 151 in parallel therewith. The circuit 148 comprises a cathode resistor 152 and a capacitor 153 in parallel therewith.

Upon the occurence of either a pulse D' or a pulse F, the tubes 144 and 146, which are normally biased to cut-off, conduct anode current to charge the capacitors 151 and 153, respectively. This charging of 151 and 153 is practically instantaneous. At the termination of the pulse D' or F, the capacitors 151 and 153 discharge at a rate that is slow compared with the charging rate and at a rate that is determined by the time constants of the circuits 147 and 148, these time constants differing from each other. Thus, as illustrated in Fig. 3, across the circuits 147 and 148 there are produced the voltage waves x and y, respectively, which are to be combined with a third voltage wave z to produce the desired logarithmic deflecting wave G.

The wave z is obtained by applying the pulses D' and F from the cathode resistor 139 over a conductor 154 to the grid of a tube 156 which includes a wave shaping network 157 in its cathode circuit. The network 157 comprises a high impedance resistor 158, the lower portion of a biasing resistor 159, and a capacitor 161. As in the wave shaping circuits for producing the waves x and y, the capacitor 161 is charged rapidly upon application of a pulse to the tube 156. To produce wave z, however, the discharge of capacitor 161 is made slow enough by proper adjustment of the time constant of network 157 so that it (unlike capacitors 151 and 153) has not discharged completely by the time the next pulse D' or F occurs. The wave z is applied to a cathode follower tube 160.

It will be seen that the effect of adding the waves x and y to the wave z is to greatly increase the slope of the deflecting wave G at its start whereby the scale for the corresponding portion of the cathode-ray trace is expanded. The waves x, y and z are added by supplying them through leads 162, 163 and 164 to the input circuit of the deflecting-wave amplifier 113. The leads 163 and 164 preferably include high impedance resistors 166 and 167 shunted by capacitors 168 and 169, respectively, for obtaining undistorted addition of the several waves. It will be apparent that the deflecting wave G may be shaped as desired for different scale expansions by changing the time constants of one or more of the circuits 147, 148 and 157.

In Fig. 2, the circuit values have been indicated in ohms, thousands of ohms, megohms, microfarads and micro-microfarads merely by way of example.

I claim as my invention:

1. In combination a plurality of resistor-capacitor circuits each comprising a capacitor shunted by a resistor and having different time constants, means for supplying direct current to said circuits for charging the capacitors therein, means for interrupting periodically the flow of charging current to said circuits whereby each of said capacitors discharges through its shunting resistor at a certain rate during each charging current interruption, means for adding the voltages appearing across said resistors to obtain a periodically recurring deflecting voltage having a wave form of decreasing slope, and means for supplying said added voltages to a utilization circuit.

2. In combination a plurality of resistor-capacitor circuits each comprising a capacitor shunted by a resistor and having different time constants, means for supplying direct current to said circuits for charging the capacitors therein, means for interrupting periodically and substantially simultaneously the flow of charging current to said circuits whereby each of said capacitors discharges through its shunting resistor during each charging current interruption at a rate determined by the time constant of said discharging circuit, means for adding the voltages appearing across said resistors to obtain a periodically recurring deflecting voltage having a wave form of decreasing slope, and means for supplying said added voltages to a utilization circuit.

3. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for supplying direct-current to said circuits for charging the capacitors therein to a predetermined direct-current potential, and means for interrupting periodically the flow of charging current to said circuits, and means for applying the sum of the voltages that appear across said circuits during said periods of current interruption to a utilization circuit.

4. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for charging the capacitors of said circuits to a predetermined direct-current potential including means for charging at least one of said capacitors through said cathode-anode impedance, and means for interrupting periodically the flow of charging current to said capacitors including means for applying to said grid periodically recurring negative pulses of sufficient amplitude to drive said tube periodically to anode current cut-off, and means for applying the sum of the voltages that appear across said circuits during said periods of current interruption to a utilization circuit.

5. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for charging the capacitors of said circuits to a predetermined direct-current potential through said cathode-anode impedance, and means for applying to said grid periodically recurring negative pulses of sufficient amplitude to drive said tube periodically to anode current cut-off, and means for applying the voltage that appears across said circuits during said cut-off periods to a utilization circuit.

6. A cathode-ray deflection wave circuit comprising a plurality of vacuum tubes each having an anode, a cathode and a control grid, a plurality of resistor-capacitor circuits having different time constants and connected in the cathode circuits of said tubes, respectively, each resistor-capacitor circuit comprising a capacitor shunted by a resistor, means including said vacuum tubes for charging the capacitors in the respective cathode circuits of said tubes to a predetermined direct-current potential through the respective cathode-anode impedances of said tubes, and means for applying to said grids periodically recurring negative pulses of sufficient amplitude to drive said tubes periodically to anode current cut-off whereby said capacitors discharge through their shunting resistors during said cut-off periods, and means for applying the sum of the voltages that appear across said circuits during said cut-off periods to a utilization circuit.

7. In combination a plurality of resistor-capacitor circuits each comprising a capacitor shunted by a resistor and having different time constants, means for supplying direct current to said circuits for charging the capacitors therein, means for interrupting periodically the flow of charging current to said circuits whereby each of said capacitors discharges through its shunting resistor at a certain rate during each charging current interruption, means comprising a resistor-capacitor delay network for delaying the voltage appearing across the resistor-capacitor circuit having the faster time constant, and means for adding the voltages appearing across said resistors to obtain a periodically recurring deflecting voltage having a wave form of decreasing slope.

8. The invention according to claim 4 wherein the time constant of one of said resistor-capacitor circuits is short compared with said period of anode current cut-off and wherein the time constant of another of said resistor-capacitor circuits is long compared with said period of anode current cut-off.

9. The invention according to claim 5 wherein the time constant of one of said resistor-capacitor circuits is short compared with said period of anode current cut-off and wherein the time constant of another of said resistor-capacitor circuits is long compared with said period of anode current cut-off.

GEORGE D. HULST, Jr.

REFERENCES CITED

The following references are of record in the file of this patent:

UNITED STATES PATENTS

| Number | Name | Date |
|---|---|---|
| 2,207,540 | Hansell | July 9, 1940 |
| 2,215,776 | Barnard | Sept. 24, 1940 |
| 2,272,849 | Perkins | Feb. 10, 1942 |
| 2,280,949 | Hall | Apr. 28, 1942 |
| 2,300,189 | Wolff | Oct. 27, 1942 |
| 2,328,248 | Andrieu | Aug. 31, 1943 |
| 2,329,137 | Richards | Sept. 7, 1943 |
| 2,354,086 | MacKay | July 18, 1944 |